US012795048B1

(12) United States Patent
Vandyke et al.

(10) Patent No.: US 12,795,048 B1
(45) **Date of Patent: *Nov. 10, 2026**

(54) PRIVATE CONVERSATIONS IN A VIRTUAL SETTING

(71) Applicant: Apple Inc., Cupertino, CA (US)

(72) Inventors: James W. Vandyke, Menlo Park, CA (US); Nikolas T. Vitt, Redwood City, CA (US); Sean A. Ramprashad, Los Altos, CA (US); Neal D. Evans, Sunnyvale, CA (US); Jonathan D. Sheaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/501,828

(22) Filed: Nov. 3, 2023

Related U.S. Application Data

(63) Continuation of application No. 16/904,342, filed on Jun. 17, 2020, now Pat. No. 11,812,194.

(Continued)

(51) Int. Cl.
*H04N 7/15* (2006.01)
*G02B 27/01* (2006.01)
(Continued)

(52) U.S. Cl.
CPC ........... *H04N 7/157* (2013.01); *G02B 27/017* (2013.01); *G06F 3/013* (2013.01);
(Continued)

(58) Field of Classification Search
None
See application file for complete search history.

(56) References Cited

U.S. PATENT DOCUMENTS

| | | | | |
|---|---|---|---|---|
| 8,379,821 B1 * | 2/2013 | Ramage | .................. | H04M 3/42 379/202.01 |
| 9,451,210 B1 * | 9/2016 | Smus | ...................... | G06F 3/012 |

(Continued)

FOREIGN PATENT DOCUMENTS

| | | | |
|---|---|---|---|
| DE | 102015003948 | A1 | 9/2016 |
| WO | 2019067780 | A1 | 4/2019 |
| WO | 2020/210298 | A1 | 10/2020 |

OTHER PUBLICATIONS

International Search Report and Written Opinion received for PCT Patent Application No. PCT/US2020/027186, mailed on Sep. 2, 2020, 14 pages.

(Continued)

*Primary Examiner* — Duc Nguyen
*Assistant Examiner* — Assad Mohammed
(74) *Attorney, Agent, or Firm* — Aikin & Gallant, LLP

(57) ABSTRACT

A method performed by a processor of an electronic device. The method presents a computer-generated reality (CGR) setting including a first user and several other users. The method obtains, from a microphone, an audio signal that contains speech of the first user. The method obtains, from a sensor, sensor data that represents a physical characteristic of the first user. The method determines, based on the sensor data, whether to initiate a private conversation between the first user and a second user of the other users, and in accordance with a determination to initiate the private conversation, initiates the private conversation by providing the audio signal to the second user.

21 Claims, 5 Drawing Sheets

Related U.S. Application Data

(60) Provisional application No. 62/865,099, filed on Jun. 21, 2019.

(51) Int. Cl.

| | |
|---|---|
| ***G06F 3/01*** | (2006.01) |
| ***H04L 9/40*** | (2022.01) |
| ***H04L 12/18*** | (2006.01) |
| ***H04L 65/4038*** | (2022.01) |

(52) U.S. Cl.

CPC ...... *H04L 12/1822* (2013.01); *H04L 63/0428* (2013.01); *H04L 65/4038* (2013.01)

(56) References Cited

U.S. PATENT DOCUMENTS

| | | | | |
|---|---|---|---|---|
| 11,032,335 | B1 * | 6/2021 | Knas | H04L 65/403 |
| 11,126,395 | B2 | 9/2021 | Blume et al. | |
| 2009/0303984 | A1 | 12/2009 | Clark et al. | |
| 2012/0122525 | A1 | 5/2012 | Miller et al. | |
| 2012/0173631 | A1 | 7/2012 | Yoakum et al. | |
| 2013/0150133 | A1 | 6/2013 | Alameh et al. | |
| 2013/0190016 | A1 * | 7/2013 | Krishnakumar | H04W 4/029 455/456.3 |
| 2015/0215581 | A1 | 7/2015 | Barzuza et al. | |
| 2015/0302869 | A1 | 10/2015 | Tomlin et al. | |
| 2016/0093108 | A1 | 3/2016 | Mao et al. | |
| 2017/0093944 | A1 * | 3/2017 | Hockett | H04L 65/762 |
| 2018/0005429 | A1 | 1/2018 | Osman et al. | |
| 2018/0034867 | A1 | 2/2018 | Zahn et al. | |
| 2018/0189568 | A1 * | 7/2018 | Powderly | G06V 30/194 |
| 2018/0270571 | A1 | 9/2018 | Di Censo et al. | |
| 2018/0316893 | A1 | 11/2018 | Rosenberg et al. | |
| 2020/0301562 | A1 * | 9/2020 | Gupta | G06N 10/80 |
| 2021/0327140 | A1 | 10/2021 | Rothkopf et al. | |

OTHER PUBLICATIONS

Invitation to Pay Additional Fees and Partial International Search Report received for PCT Patent Application No. PCT/US2020/027186, mailed on Jul. 10, 2020, 8 pages.

International Preliminary Report on Patentability received for PCT Patent Application No. US2020/027186, mailed Oct. 21, 2021, 10 pages.

Non-Final Office Action received for U.S. Appl. No. 17/359,169, mailed on Apr. 5, 2022, 18 pages.

* cited by examiner

PRIVATE CONVERSATIONS IN A VIRTUAL SETTING

CROSS-REFERENCE TO RELATED APPLICATION

This application is a continuation of co-pending U.S. patent application Ser. No. 16/904,342, filed Jun. 17, 2020, which claims the benefit of and priority to U.S. Provisional Patent Application Ser. No. 62/865,099, filed Jun. 21, 2019, which is hereby incorporated by this reference in its entirety.

FIELD

An aspect of the disclosure relates to engaging in private conversation between several users within a virtual setting.

BACKGROUND

In recent years, virtual reality (VR) systems have become more ubiquitous in different industries, such as gaming and entertainment because of advancements in computer technology. Specifically, advancements in hardware and in software provide users with a more seamless and realistic experience within virtual worlds. In addition, with the proliferation of mobile devices (e.g., smartphones) and the creation of do-it-yourself stereoscopic viewers, users are no longer tied to a stand-alone VR system. Instead, users may simply attach the smartphone to the viewer and immediately engage in a virtual world.

SUMMARY

An aspect of the disclosure is a method for allowing the first user to engage in a private conversation with a second user. The private conversation may take place while both users are participating in a computer-generated reality (CGR) setting (or environment). To participate, each user may have an electronic device, such as a head-mounted device (HMD) that is worn by the users, that is configured to present the CGR setting by displaying a graphical representation of the CGR setting on a display screen and driving a speaker using an audio signal containing sounds of the CGR setting. Each user may be represented by an avatar within the CGR setting, such that the avatar may perform actions (e.g., moving within the CGR setting) in response to user-commands. In addition, speech of each user may be picked up by microphones of the user's HMD and be projected into the CGR setting, as if said by the user's avatar. As a result, several users may conduct a virtual conference through their respective avatars within a same CGR setting (e.g., a virtual conference room), regardless of the user's physical location. For instance, the first and second users may be sitting side-by-side, each wearing their own HMDs, while other users may participate in the virtual conference from different physical locations.

To initiate the private conversation, the HMD of the first user obtains sensor data from a sensor (e.g., an accelerometer, a gyroscope, etc.) that indicates a movement of the first user. For example, since the HMD is worn on the head of the first user, sensor data may indicate that the user's head has moved or tilted. The HMD determines whether to initiate a private conversation between the first user and the second user from this movement. Returning to the previous example, the HMD of the first user may determine that the first user is attempting to initiate a private conversation with the second user because the first user's head is tilting towards the second user, who may be sitting right next to the first user. Such a movement may be indicative of the first user trying to lean towards the second user in order to whisper something in the second user's ear. Thus, upon determining that the first user is trying to say something private to the second user, the HMD causes a virtual/visual privacy cloak to activate in the CGR setting that includes the first and second user's avatars. A privacy cloak is a visual indication that the first and second users are engaged in a private conversation, where speech of either user is not projected out of the privacy cloak and into a remainder of the CGR setting for others to hear. Instead, the HMDs of the first and second users may establish a two-way private audio channel so that both users may talk freely without concern that others who are participating in the CGR setting can hear what they are saying.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
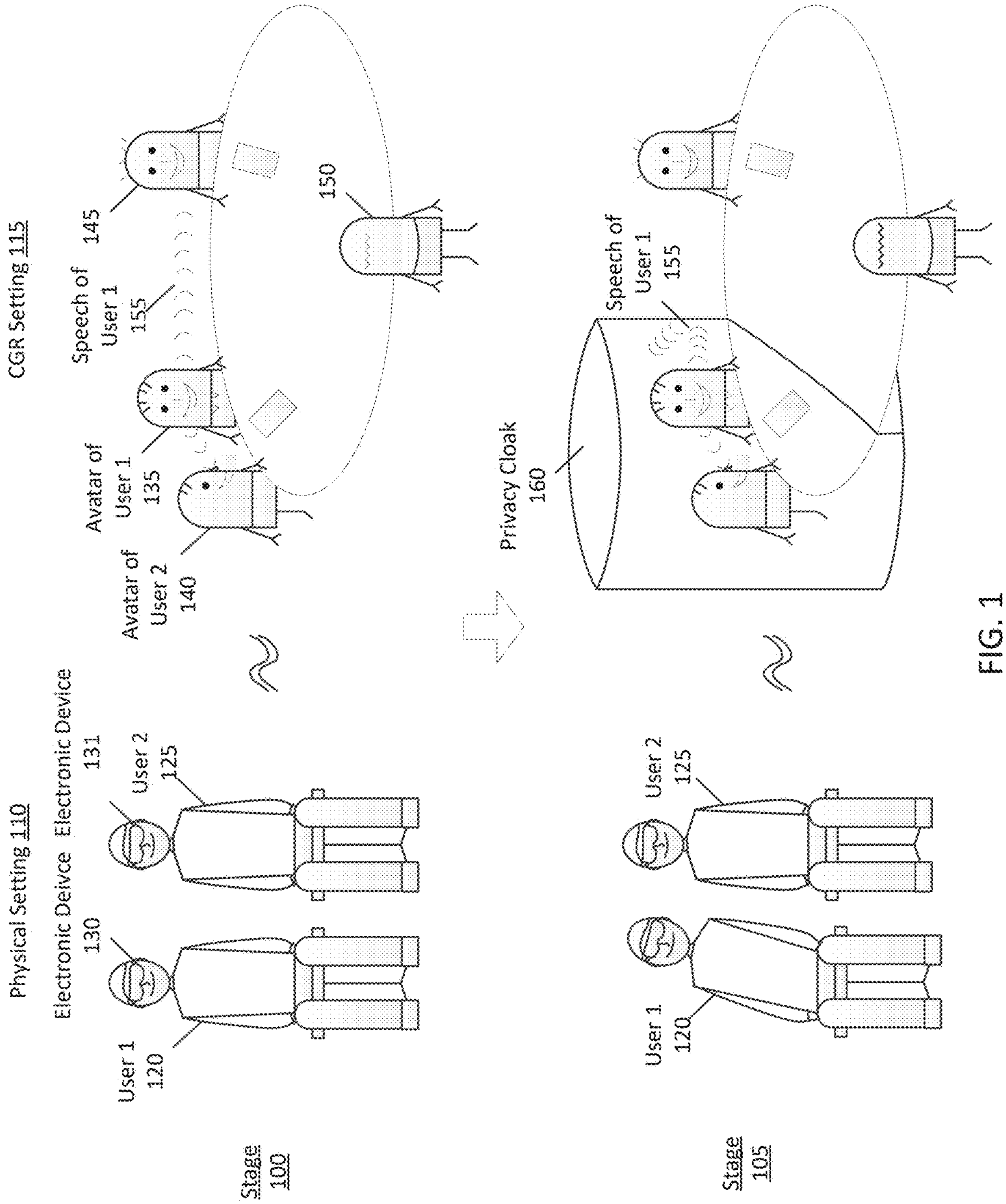
FIG. 1 shows two users that engage in a private conversation in a computer-generated reality (CGR) setting.

Several aspects of the disclosure with reference to the appended drawings are now explained. Whenever the shapes, relative positions, and other aspects of the parts described in the aspects are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

A physical environment (or setting) refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment (setting) refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems (or head mounted devices (HMDs)), projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 shows two users who engage in a private conversation in a CGR setting. Specifically, this figure illustrates two stages 100 and 105 in which two users, user 1 120 and user 2 125 engage in a private conversation by activating a privacy cloak 160 in the CGR setting 115, thereby preventing others who are participating in the CGR setting from listening (or eavesdropping in) to their conversation.

Each stage includes a preview of a physical setting (or environment) 110, such as a conference room that includes both users 120 and 125 who are sitting next to each other and using electronic devices 130 and 131, respectively. Electronic devices 130 and 131 can include any type of device with a display, such as a smart phone, tablet computer, laptop, desktop computer, HMD, or the like. Through the use the electronic devices, both users are participating in a virtual meeting in the CGR setting 115 (e.g., a virtual conference room) that includes avatars 135-150, each corresponding to a user (or participant) in the meeting. In particular, electronic devices 130 and 131 both present the CGR setting 115 to each user 120 and 125 through the perspective of their respective avatars 135 and 140 (e.g., in a first-person perspective). While electronic devices of other users (not shown) present the CGR setting 115 through the perspective of avatars 145 and 150. In addition, each electronic device 130 and 131 includes at least one speaker that is configured to output sound of the CGR setting 115 as heard from the perspective of the electronic device's respective avatar. In one aspect, rather than present the CGR setting 115 in the first-person perspective, the electronic devices may present the CGR setting 115 in another perspective, such as a third-person perspective as illustrated herein. More about how the electronic devices present the CGR setting is described herein.

Stage 100 illustrates user 1 120 talking to user 2 125 and another user who is participating in the virtual meeting. In particular, the avatar 135 is projecting speech 155 into the CGR setting 115, which is being heard by avatars 140 and 145. In one aspect, the user of avatar 145 is located in a different physical location than users 1 and 2 (e.g., in a different conference room). In another aspect, to talk in the virtual meeting, user 1's electronic device 130 captures sound (e.g., the user's speech) using one or more microphones integrated therein. For example, as user 1 speaks, the electronic device's microphone is configured to convert the sound into an audio signal (e.g., microphone signal) that the electronic device 130 transmits (e.g., via a wireless local area network) to each of the other user's electronic devices (e.g., electronic device 131). The other users' electronic devices then use the obtained microphone signal to drive at least one speaker for each respective device. More about how electronic devices output sound of the CGR setting is described herein.

Stage 105 illustrates user 1 120 and user 2 125 engaging in a private conversation that is inaudible to other participants (e.g., the users of avatars 145 and 150) in the CGR setting 115. To initiate the private conversation, user 1 120 leans towards user 2 (in either the physical or CGR setting) or brings electronic device 130 towards electronic device 131, as if to whisper something in user 2's ear. The electronic device 130 determines that user 1 120 wishes to say something private (e.g., something that shouldn't be projected into the CGR setting 115 for others to hear) based on this movement. In one aspect, the electronic device 130 may detect this movement using sensor data obtained from on-board sensors (e.g., a gyroscope, accelerometer, etc.) and/or position data of electronic device 130 and electronic device 131. For example, the electronic device 130 may obtain position data of electronic device 131 that indicates its position and/or orientation. Electronic device 130 may use the position data to determine electronic device 131's position and/or orientation with respect to electronic device 130. The electronic device 130 may monitor its position and determine whether user 1 120 wishes to have a private conversation when the distance between electronic device 130 and electronic device 131 (or the distance between avatar representations of users 1 and 2) is below a threshold distance (e.g., one foot), which may be indicative of a person leaning in to say something private to another person. More about how the electronic device determines whether a user wishes to initiate a private conversation is described herein.

In response to determining that user 1 120 wishes to engage in the private conversation, the electronic device 130 is configured to cause a privacy cloak 160 to activate in the CGR setting 115. The privacy cloak 160 is a visual indication presented in the CGR setting 115 to represent that users associated with avatars within the confines of the cloak 160 are having a private conversation. For example, as illustrated, upon activation of the privacy cloak 160, speech of user 1 155 that was being heard by the user of avatar 145 is now being reflected off the boundary of or absorbed by the privacy cloak 160. This reflection represents that the speech remains audible to only users associated with avatars that are within the cloak, such as users 1 and 2. In one aspect, to have the private conversation, each electronic device may exchange audio data (e.g., microphone signals containing speech) with other electronic devices that have associated avatars within the confines of the privacy cloak 160. In this example, electronic device 130 may exchange audio data (e.g., through a private two-way audio channel) with electronic device 131, and vice a versa. More about how electronic devices conduct the private conversation is disclosed herein.

In one aspect, avatars associated with users participating in the CGR setting who are outside of the cloak are unable to hear the conversation taking place between avatars within the cloak 160. Specifically, electronic devices associated with avatars 145 and 150 do not receive audio data from electronic devices 130 and/or 131, while the privacy cloak is activated. In this stage, the privacy cloak 160 is a cylinder that encompasses avatars 135 and 140 of users 120 and 125, respectively. In one aspect, the privacy cloak may be any shape (e.g., a cube, etc.). More about the characteristics of the privacy cloak is described herein.

Users in a physical setting, who wish to engage in a private conversation with another person, may whisper something into that other person's ear. For users who wish to engage in a private conversation while in a CGR setting, however, such an action may not be as straight forward. For instance, conventional methods for users who wish to engage in a private conversation while interacting via avatars in the CGR setting may require additional steps and be burdensome to the users. For instance, to relay private information, users may need to direct message one another. In such a case, users would either need to exit the CGR setting entirely or divert attention away from the CGR setting in order to conduct the conversation. In either case, others participating within the CGR setting would be unaware that a conversation was taking place and would be left to wonder what was happening. For instance, if two users diverted attention away to direct message one another, their avatars within the CGR setting would remain motionless. The present disclosure overcomes this ambiguity by providing a privacy cloak that allows users to seamlessly transition into a private conversation, while at the same time providing a visual indication to other users within the CGR setting that the private conversation is taking place. In addition, as described herein, once users have concluded their private conversation, the privacy cloak may be deactivated and communication between users within the CGR setting may continue.

Figure 2:
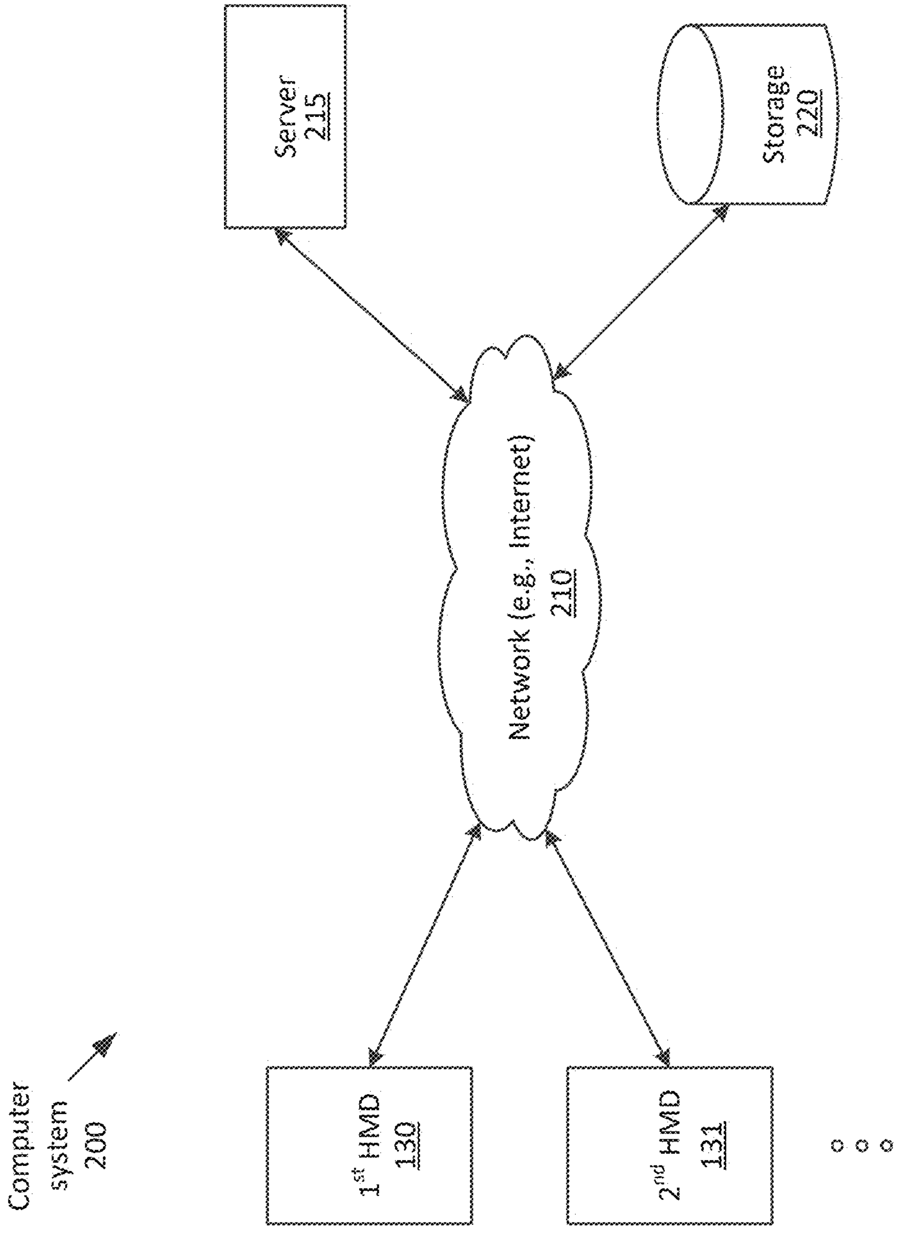
FIG. 2 shows a block diagram illustrating a computer system for presenting a CGR setting between several electronic devices.

FIG. 2 illustrates a computer system 200 for presenting a CGR setting between several electronic devices, such as HMDs. The system 200 includes the first electronic device 130 and the second electronic device 131 of FIG. 1 that are communicatively coupled to a network (e.g., Internet) 210. As shown, the network 210 is also communicatively coupled to a server 215 and a storage 220. In one aspect, at least one of the electronic devices is communicatively coupled to the network 210 via one or more electronic devices and/or networks. For example, electronic device 130 may be a wireless device that is configured to establish a wireless connection with the network 210 over a wireless computer network, using e.g., BLUETOOTH protocol or a wireless local area network. As another example, the electronic device 130 is configured to establish a (wired or wireless) connection (e.g., pair) with a media playback device (not shown), such as a smart phone, a tablet computer, a laptop, a desktop computer, etc., which in turn is communicatively coupled with the network 210. During the established connection with the media playback device, the electronic device 130 may exchange (e.g., transmit and receive) data packets (e.g., Internet Protocol (IP) packets) with the media playback device and/or the network 210 via the media playback device. More about pairing electronic devices with other electronic devices is described herein.

The electronic devices are also configured to communicate, via the network 210, with the server 215 and/or backend devices, such as (but not limited to) the storage 220. In one aspect, the server 215 may be a real electronic server (e.g., having one or more processors), a virtual machine, or a machine running in a cloud infrastructure). In one aspect, the server 215 is configured to perform cloud-based CGR setting rendering operations to render CGR settings to be transmitted to electronic devices, via the network 210 for presentation. In one aspect, the server 215 may perform image and/or audio rendering for CGR settings that are to be presented by electronic devices. For example, the server 215 may retrieve graphical data (e.g., three-dimensional (3D) models, etc.) from storage 220 and 3D render the CGR setting. The server 215 may transmit the renderings, via the network 210, to each electronic device in order for the electronic device to display the renderings on a display screen, as described herein. In one aspect, the server 215 may be configured to render the CGR setting in real-time based on user input. For example, the electronic device 130 may transmit, via the network 210, input streams that include packets (e.g., IP packets) containing data of user input into the electronic device. This input may include adjustments in avatar position within the CGR setting. These adjustments may change the perspective of the CGR setting being presented through the display screen of the electronic device. The server 215 uses this data to update renderings of the CGR setting, according to changes in the avatar's position. In another aspect, the server 215 may render audio data of the CGR settings and transmit it (e.g., as data packets) to each of the electronic devices participating within the CGR setting. For example, the electronic devices may transmit microphone signals captured by microphones of the electronic devices. The server 215 may render audio data of the CGR settings according to the microphone signals and distribute the rendered audio data to electronic devices, which is used by the electronic devices to produce audio driver signals for driving speakers integrated therein. In one aspect, the server 215 may spatially render the audio data in order to provide an immersive audio experience to the user of the electronic device. In another aspect, the electronic devices may perform additional image/audio processing operations upon the data received from the server 215.

In another aspect, at least some of the rendering operations may be performed locally. For example, the server 215 may distribute input streams and/or audio streams (e.g., including microphone signals) from electronic devices to other electronic devices that are presenting a CGR setting. As an example, electronic device 130 may transmit microphone signals having sound captured by its microphones to electronic device 131, via server 215 and/or network 210, for rending and outputting through at least one speaker. With respect to received input streams, the electronic devices may update renderings of the CGR settings for display as described herein.

In another aspect, at least some of the operations described herein may be performed by an electronic device (e.g., media playback device), in which the electronic device is paired. Specifically, a processor integrated into a housing of the media playback device may perform one or more operations described herein, such as audio/image processing operations and/or rendering operations. For example, in the case of rendering operations, the media playback device may render the CGR setting and transmit the renderings to the electronic device for display.

Figure 3:
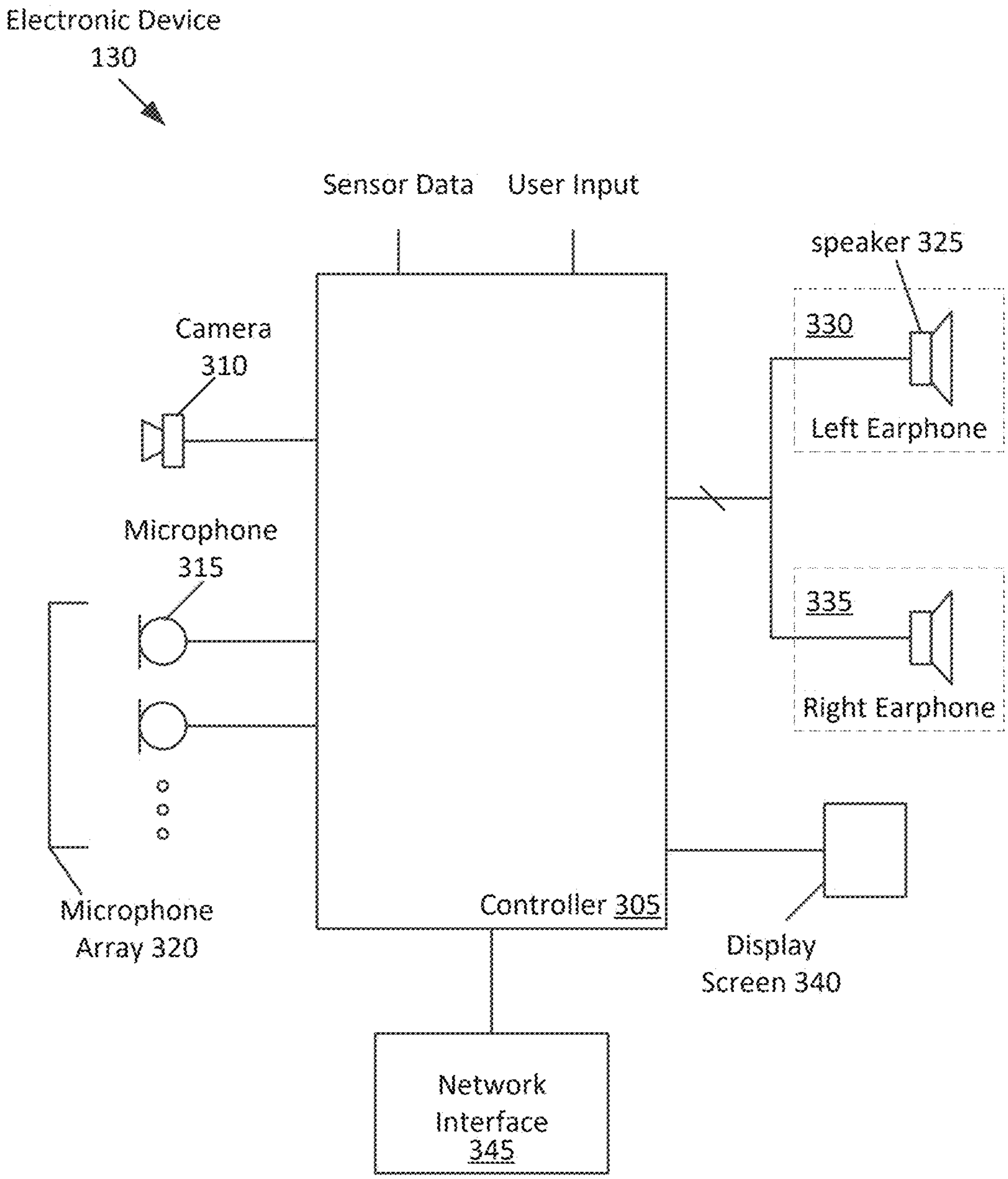
FIG. 3 shows a block diagram of an electronic device according to one aspect of the disclosure.

FIG. 3 shows a block diagram of electronic device 130 according to one aspect of the disclosure. The electronic device 130 includes a controller 305, a camera 310, a microphone array 320 having two or more microphones 315, earphones 330 and 335, each having one or more earphone speakers 325, at least one display screen 340, and a network interface 345. In one aspect, the electronic device 131 of FIG. 1 may have at least some of the elements of which are included with electronic device 130. In one aspect, at least some of these elements are integrated into a housing of the electronic device 130. In another aspect, the electronic device 130 may include fewer elements as listed herein, such as not having a display screen 340. In other aspects, the electronic device 130 may include additional elements, such as having two or more cameras 310 and two or more display screens 340, one for each eye of a user. In one aspect, as described herein, the electronic device 130 may be a wireless device. For example, the network interface 345 is configured to establish a wireless communication link with a wireless access point in order to exchange data with an electronic server over a wireless network, as described herein.

In one aspect, at least some of the elements of the electronic device 130 described herein (e.g., the camera 310) may be a part of a different electronic device within the computer system, or may be standalone device that communicates with the electronic device 130 via a wired (or wireless) communication link. For example, the earphones 330 and 335 may be wireless (e.g., BLUETOOTH) earphones that are communicatively coupled with the electronic device 130.

In one aspect, the camera 310 is a complementary metal-oxide-semiconductor (CMOS) image sensor that is capable of capturing digital images as image data that represent a field of view of the camera 310, where the field of view includes a scene of an environment in which the electronic device 130 is located. In some aspects, the camera 310 may be a charged-coupled device (CCD) camera type. The camera 310 is configured to capture still digital images and/or video that is represented by a series of digital images. In one aspect, the camera is an "external" camera that is in a frontal position of the electronic device 130 with respect to a user who is to wear the electronic device in order for the field of view of the camera to project outward and in a frontal direction. In another aspect, the camera may be positioned differently. For instance, the camera may be an "internal" camera such that it has a field of view that includes at least one portion of the user (e.g., an eye) of the user. Thus, the internal camera may be positioned proximate to the display screen 340 of the electronic device 130. Such a position may promote the use of eye tracking of the user, as described herein. In some aspects, there may be more than one camera. For instance, the electronic device 130 may include two cameras: an external camera that has an outwardly projecting field of view from the electronic device and an internal camera with a field of view that projects inward towards the user of the electronic device.

The display screen 340, as described herein, is configured to display image and/or video data to the user of the electronic device 130. In one aspect, the display screen 340 may be a miniature version of known displays, such as liquid crystal displays (LCDs), organic light-emitting diodes (OLEDs), etc. In another aspect, the display may be an optical display that is configured to project digital images upon a transparent (or semi-transparent) overlay, through which a user can see. The display screen 340 may be positioned in front of one or both of the user's eyes.

Each microphone 315 of the microphone array 320 may be any type of microphone (e.g., a differential pressure gradient micro-electromechanical system (MEMS) microphone) that is configured to convert acoustic energy caused by sound waves propagating in an acoustic environment into an audio signal.

Each speaker 325 within the earphones 330 and 335 may be an electrodynamic driver that may be specifically designed for sound output at certain frequency bands, such as a subwoofer, tweeter, or midrange driver, for example. In one aspect, each speaker 325 may be a "full-range" (or "full-band") electrodynamic driver that reproduces as much of an audible frequency range as possible. Each speaker "outputs" or "plays back" audio by converting an analog or digital speaker driver signal into sound. In one aspect, the electronic device (and/or earphone) includes a driver amplifier (not shown) for each speaker 325 that can receive an analog input from a respective digital to analog converter, where the later receives its input digital audio signal from the controller 305.

In one aspect, the earphones 330 and 335 each include a housing that contains the speaker 325, and is desired to fit around the ear, over the ear, or in the ear (e.g., earbud) of a wearer of the electronic device. As illustrated in this figure, there may be a left housing for a left ear, and a right housing for the right ear. In one aspect, the earphones 330 and 335 may be part of a head-worn device, such as a helmet, eye glasses, or a pair of headphones (e.g., composed of a bridge to which left and right earcups are attached). In one aspect, rather than each earphone 330 and 335 including a single speaker 325, the earphones may each include two or more speakers, where some of the speakers may be specially designed for sound output at different frequency bands.

In another aspect, in addition to (or in lieu of) having the earphones 330 and 335, the electronic device 130 may include "extra-aural" speakers that may be integrated into a housing of the electronic device 130 and arranged to project (or output) sound directly into the environment. This is in contrast to the earphones 330 and 335 that produce sound directly into a respective ear of a user of the electronic device. In one aspect, these extra-aural speakers may form a speaker array that is configured to produce spatially selective sound output. For example, the array may produce directional beam patterns of sound that are directed towards locations within the environment, such as the ears of the user of the electronic device 130. More about audio processing is described herein.

The controller 305 may be a special-purpose processor such as an application-specific integrated circuit (ASIC), a general purpose microprocessor, a field-programmable gate away (FPGA), a digital signal controller, or a set of hardware logic structures (e.g., filters, arithmetic logic units, and dedicated state machines). The controller 305 is configured to obtain sensor data and/or user input (e.g., from a user wearing the electronic device 130) and perform various operations based on the data and input. In one aspect, the sensor data may be obtained from one or more sensors (not shown) integrated into the electronic device 130 and/or sensors that are communicatively coupled with the electronic device 130. For instance, a sensor may be integrated into a wearable device, such as a smart watch that is worn by the user of the electronic device. The sensor may be a motion sensor (e.g., an accelerometer, a gyroscope, etc.) that is configured to produce sensor data that represents a physical characteristic of the user. For instance, the physical characteristic may be a movement of the user, such as a physical gesture, a physical position of the user, and an eye gaze of the user. More about physical characteristics is described herein.

In one aspect, the sensor data may include image data of digital images captured by the camera 310 and/or audio data of one or more microphone signals produced by the microphones 315 of the array 320. User input may include user commands, such as voice commands of the user. In one aspect, user input is obtained from peripheral devices, such as a controller that is communicatively coupled (e.g., wired or wireless) to the electronic device 130. In another aspect, the user input may be obtained through selection of a graphical user interface displayed on a touch screen (not shown) of the electronic device 130.

In one aspect, the controller 305 is configured to update a rendering of the CGR setting based on the sensor data and/or user input, as described herein. For example, referring to FIG. 1 and with respect to user 1 120, the user input may be a control signal from a controller with a directional pad to move the avatar 135 throughout the CGR setting 115. Similarly, the sensor data may represent movement of user 1 120 that the controller 305 uses to move the avatar 135 as well.

In another aspect, the controller 305 is configured to determine whether to initiate a private conversation between at least two users (e.g., user 1 of the electronic device 130 and user 2 of electronic device 131) who are interacting (e.g., via avatars) in a CGR setting based on a physical characteristic or a command of the user of the electronic device 130. Upon determining to initiate the private conversation, the controller 305 is further configured to 1) cause a privacy cloak to activate in the CGR setting as a visual indication that the users are engaged in a private conversation and 2) ensure that speech exchanged between the users is not projected outside the privacy cloak into a remainder of the CGR setting for others within the CGR setting to hear. More about how the controller determines whether to initiate a private conversation is described herein.

In one aspect, the controller 305 is configured to perform image processing operations upon digital images captured by the camera 310. Specifically, the controller 305 is configured to perform object recognition (e.g., through the use of an object recognition algorithm) upon the digital images in order to detect objects that are captured within the field of view of the camera 310. For example, the controller 310 may process the digital images to identify patterns therein (e.g., structural patterns) and compare them to previously stored patterns therein. Once a matching pattern is found, the controller 310 is said to detect the object within the digital image. In one aspect, the controller 310 is further configured to track a person's eyes that are within a digital image captured by the camera 310.

In particular, the controller 310 performs an eye tracking algorithm to determine eye gaze of a user of the electronic device 130 (and/or another user of another electronic device). For instance, the eye tracking algorithm may measure eye positions and/or eye movement of at least one eye in a digital image to determine a direction (or point) of gaze with respect to a reference point. In one aspect, the eye tracking algorithm determines the direction of gaze based on optical tracking of corneal reflections. For example, (e.g., visible, near-infrared, infrared, etc.) light is directed towards eyes of the user, causing reflections in the cornea. A camera captures the reflections, from which a direction of gaze is determined with respect to the electronic device (e.g., the position of the camera 310). In another aspect, the controller 305 may determine the direction of gaze based on reflections of the display screen 340. In this aspect, a field of view of a camera (e.g., 310) may include an eye of the user who is wearing the electronic device 130. The controller may determine the user's direction of gaze based on reflections of the display screen 340 off the user's eyes. In another aspect, the controller 305 may determine the direction of gaze by keeping track of movements of the (e.g., pupils of the) eyes. In one aspect, the eye tracking algorithm may use any method to determine the direction of gaze of a person. In some aspects, any of these methods may determine the direction of gaze of a user (or wearer) of the electronic device and/or another person who is facing the user.

In another aspect, the controller 305 is further configured to receive audio signals from the microphones 315 of the microphone array 320, to perform audio processing operations thereon. In particular, the controller 305 may include a sound pickup beamformer that can be configured to process the microphone signals to form directional beam patterns for spatially selective sound pickup in certain directions, so as to be more sensitive to one or more sound source locations. For example, referring to FIG. 1, microphone array 320 may direct a beam pattern towards the user 1's mouth in order to capture the user's speech 155, while minimizing undesired sounds and noises within the physical setting 110.

As another example, the controller 305 is further configured to implement (activate) an active noise cancellation (ANC) function to cause one or more speakers 325 (or at least one of the earphones 330 and 335) to produce anti-noise in order to reduce ambient noise from the environment that leaks into the user's ear. In one aspect, the noise may be the result of an imperfect seal of a cushion of an earphone (e.g., when the earphones 330 and 335 are a pair of over-ear headphones) that rests upon the user's ear. The ANC function may be implemented as one of a feedforward ANC, a feedback ANC, or a combination thereof. As a result, the controller 305 may obtain a reference microphone signal that contains external ambient sound from a microphone 315 and/or the controller 305 may obtain a reference (or error) microphone signal from a microphone that captures sound from inside the user's ear. In one aspect, the controller 305 is configured to produce an anti-noise signal form at least one of the reference (and/or error) microphone signals. The ANC function may be implemented as a non-adaptive and/or adaptive ANC. In one aspect, the controller 305 is configured to implement different levels (or effectiveness) of the ANC function, in order to allow a user to hear at least some ambient noise from the environment.

As another example, the controller 305 may perform acoustic (or aural) transparency functions to render microphone signals of ambient sound captured by the microphones 315 of the array 320 within the environment in which the electronic device 130 is located to cause the earphones 330 and 335 to reproduce the ambient sound. Specifically, this function enables the wearer of the electronic device 130 to also hear the ambient sound within the environment more clearly, and preferably in a manner that is "transparent" as possible, e.g., as if the electronic device 130 was not being worn by the user, or more specifically that the earphones 330 and 335 were not in (on or over) the user's ears during operation. To do this, the controller 305 obtains microphone (e.g., ambient audio) signals from the microphone array 320. The signals include a set of sounds in the sound field of the environment in which the user of the electronic device 130 is located, where each of the set of sounds are emitted from a corresponding sound source at a location within the environment. The controller 305 processes the microphone signals captured by the array by filtering the signals through transparency filters to produce filtered signals. In one aspect, the controller applies a specific transparency filter for each microphone signal. The filtered signals are then combined into driver signals, one for each speaker 325 integrated within the earphones 330 and 335. In some aspects, the transparency filters reduce acoustic occlusion due the earphones being in, on or over the user's ear, while also preserving the spatial filtering effect of the wearer's anatomical features (e.g., head, pinna, shoulder, etc.). The filters may also help preserve the timbre and spatial cues associated with the actual ambient sound. Thus, in one aspect, the filters may be user specific, according to specific measurements of the user's head. For instance, the controller 305 may determine the transparency filters according to a head-related transfer function (HRTF) or, equivalently, head-related impulse response (HRIR) that is based on the user's anthropometrics. In one aspect, the controller 305 may perform additional audio processing operations upon the filtered signals to adjust the reproduced sound of the ambient environment contained therein. For example, the controller 305 may spectrally shape the signals and/or apply gain signals (e.g., in order to increase the sound level of the filtered signals).

In one aspect, the controller is further configured to process input audio for outputting through the speakers 325 of at least one of the earphones 330 and 335. For example, the controller 305 is to receive an input audio signal (channel) of a piece of sound program content to be rendered by the controller 305 and output through the at least one speaker 325, such as the music. In one aspect, the controller 305 may receive the input audio signal from a programmed processor that is running a media player application program. Alternatively, there may be more than one input audio channel, such as a two-channel input, namely left and right channels of a stereophonic recording of a musical work, or there may be more than two input audio channels, such as for example the entire audio sound track in 5.1-surround format. In one aspect, when there are multiple input audio channels, they may be downmixed to produce a single downmixed audio channel.

In some aspects, the controller 305 may include a sound output beamformer that is configured to produce speaker driver signals which when driving two or more speakers produce spatially selective sound output, as previously described. For example, in the case in which the electronic device 130 includes extra-aural speakers, the sound output beamformer may produce driver signals to cause the extra-aural speakers to produce directional beam patterns of sound towards locations within the physical environment (e.g., towards a user's ears). In another aspect, the controller 305 is configured to spatially render an input audio signal by applying spatial filters that may be personalized for the user of the electronic device 130 in order to account for the user's anthropometrics. For example, the controller 305 may perform binaural rendering in which the controller applies spatial filters (e.g., HRTFs) to audio signals to produce binaural signals (e.g., a left audio signal for the left earphone 330 and a right audio signal for the right earphone 335). These binaural signals cause the speakers of the earphones 330 and 335 to produce spatial audio cues to give a user the perception that sounds are being emitted from a particular location within an acoustic space. As example, referring to FIG. 1, electronic device 131 may apply HRTFs to an audio signal that is received from electronic device 130 that includes speech of user 120 in order to give the user 125 the perception that the speech is being emitted from a right-hand side of the user 125, which corresponds to the position of the avatar 135 of the user 1 120.

In one aspect, HRTFs are chosen according to the position data of sound sources (e.g., a mouth of avatar 135) within the CGR setting 115 with respect to an avatar of a user (e.g., avatar 140) in order to create a virtual sound source that is located at a position within a reproduced sound field of the CGR setting. This 3D sound provides an acoustic depth that is perceived by the user at a distance that corresponds to a virtual distance between the virtual sound source and the user's avatar. In one aspect, to achieve a correct distance at which the virtual sound source is created, the controller 305 may apply additional linear filters upon the audio signal, such as reverberation and equalization.

In one aspect, the controller 305 may perform at least some of the audio processing operations described herein, while the user engages in a private conversation. For instance, the controller 305 may activate the ANC function while user 120 is engaged in a private conversation, as illustrated in stage 105 of FIG. 1. In one aspect, the controller 305 may perform operations based on whether another electronic device is within a threshold distance from the electronic device 130 and the user of the other electronic device is engaged in a separate private conversation within the CGR setting 115. In such a case, each electronic device may perform ANC functions in order to reduce direct physical coupling between the users who are not engaged in the same private conversation.

Figure 4:
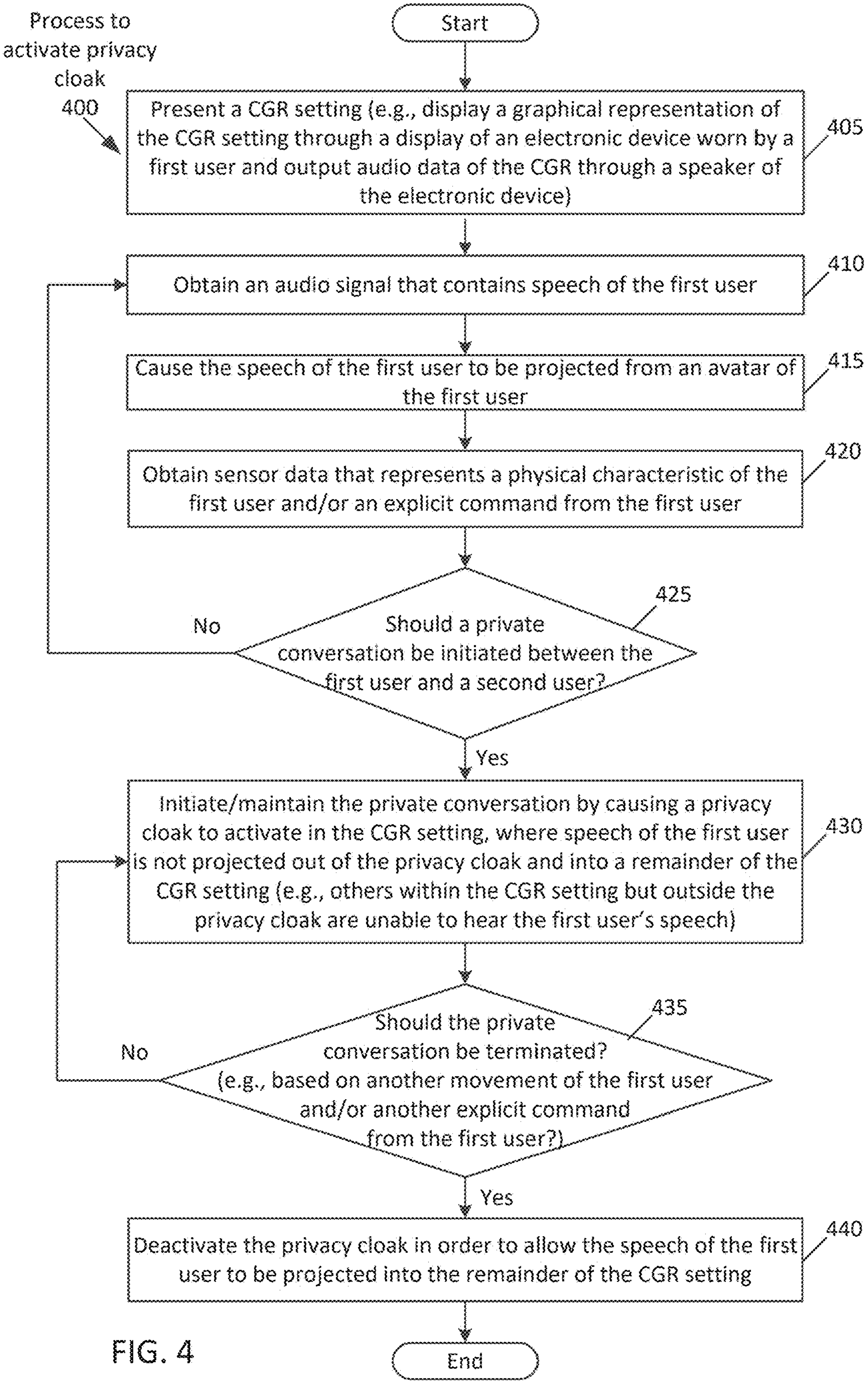
FIG. 4 is a flowchart of one aspect of a process to initiate a private conversation between several users.
Figure 5:
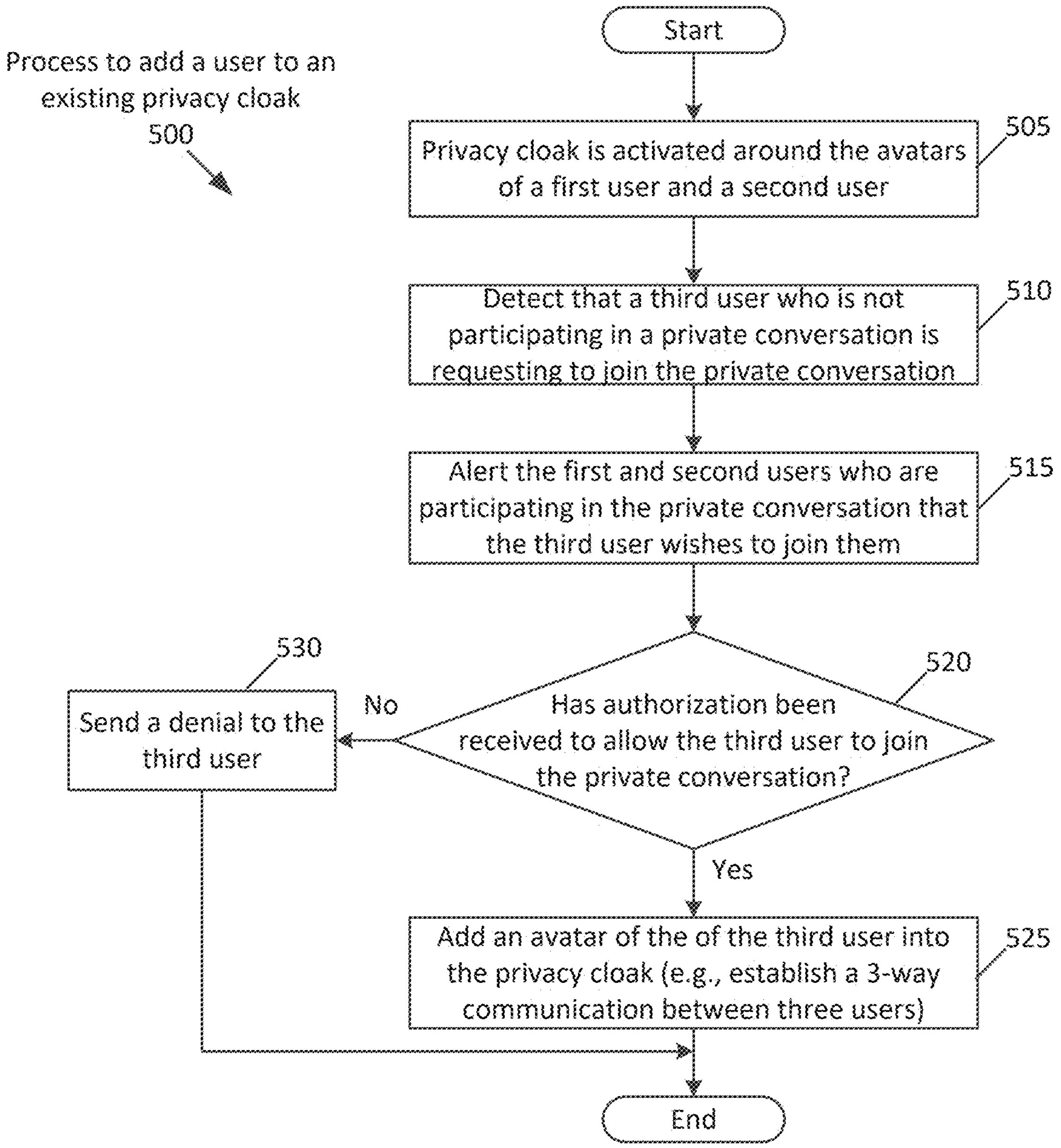
FIG. 5 is a flowchart of one aspect of a process to allow a user to join a private conversation.

FIGS. 4 and 5 are each flowcharts of aspects of processes 400 and 500 that are performed by (e.g., the controller of the) any of the electronic devices (e.g., HMDs) described herein. For instance, the operations of these processes may be performed by electronic device 130, of FIG. 1. Accordingly, FIGS. 4 and 5 will be described with reference to FIGS. 1-3.

FIG. 4 is a flowchart of one aspect of a process 400 to initiate a private conversation between a first user and a second user who are participating in a CGR setting. The process 400 begins by presenting a CGR setting representing a communication session through an electronic device, such as an HMD (at block 405). For example, the electronic device 130 may present the CGR setting that represents the communication session, which includes the user 120 and other users (e.g., user 2 125) who are participating in the CGR setting 115, as illustrated in FIG. 1. In one aspect, the electronic device 130 may present a graphical representation of the CGR setting through its display 340 (e.g., in a particular perspective) and/or drive speakers 325 of at least one of the earphones 330 and 335 with driver signals containing audio data of the CGR setting in order to reproduce sound associated with the CGR setting, as described herein. In one aspect, to present the CGR setting, a user of the electronic device 130 initiates the presentation of the CGR setting through a user input (e.g., voice command or selection of a UI item). Once initiated, an avatar (e.g., a first avatar) associated with (and representing) the user (e.g., the first user) of the electronic device 130 (e.g. first HMD) may be added into the CGR setting for other participants to see and interact with (e.g., engage in a conversation, as illustrated in FIG. 1). In one aspect, the CGR setting may include a second avatar that represents the second user of a second electronic device.

The process 400 obtains, from a microphone, an audio signal that contains speech of the first user of the electronic device (at block 410). Specifically, the audio signal may be produced by at least one microphone 315 of the microphone array 320. In one aspect, the microphone may be a part of another electronic device that is paired with the electronic device 130. The process 400 causes the speech of the user to be projected from an avatar of the first user within the CGR setting (at block 415). For instance, the electronic device 130 may transmit the microphone signal to electronic devices of each user who is (or at least some users who are) participating in the CGR setting for rendering into driver signals to use to drive an associated speaker. In one aspect, each electronic device may apply spatial rendering operations upon the microphone signal in order to provide users the perception that the speech is originating from the virtual location of the avatar. In one aspect, along with rendering the microphone signals, the electronic devices may render other sounds from within the CGR setting in order to provide each user with an immersive experience.

The process 400 obtains sensor data that represents a physical characteristic of the first user of the electronic device and/or an explicit command from the first user (at block 420). For instance, the sensor data may be produced by a motion sensor of the electronic device, and thus the physical characteristic may be a movement of the first user, as described herein. The commands, however, may be explicit commands, such as voice commands or commands received through user input. For instance, commands received through user input may include a selection of a virtual menu item that is displayed on the display screen 340 of the electronic device 130. Such a virtual menu item may be overlaid onto of the presentation of the CGR setting. In another aspect, the virtual menu item may be a part of the CGR setting. In contrast, the menu item may be displayed on a graphical user interface of the electronic device 130 or another device, such as a media playback device that is paired with the electronic device 130.

The process 400 determines whether a private conversation should be initiated between the user and another user that is participating in the CGR setting based on the sensor data (or physical characteristic) indicated by the sensor data and/or the explicit command (at decision block 425). Specifically, the electronic device 130 determines whether to initiate a private conversation between the first user and the second user. In one aspect, the electronic device 130 may perform this determination according to the physical characteristic represented by the sensor data. For instance, the electronic device 130 may compare a movement and/or command to predefined movements and/or commands that are associated with initiating a private conversation. These movements may include a physical gesture of the user, such as a hand movement, a head movement, an eye movement, or a combination thereof. The controller 305 may perform a table lookup into a data structure that associates movements (or physical characteristics) and/or explicit commands with a request from the user of the electronic device to initiate a private conversation. If the movements and/or commands match those stored within the data structure, it is determined that a private conversation is to be initiated. In one aspect, data stored within the data structure may be predefined. In another aspect, the data structure may be learned through the performance of a machine learning algorithm that identifies movements and/or commands associated with a user wishing to engage in a private conversation.

In one aspect, the determination may be further based on position data of the electronic device 130 that indicates a physical position of the electronic device 130 and other electronic devices of users who are participating in the CGR setting. For instance, referring to FIG. 1, the electronic device 130 may obtain sensor data from a motion sensor that indicates the head of the user 120 is moving (tilting) to the left. The electronic device 130 may compare this data to position data (e.g., global positioning system (GPS) coordinates, etc.) of the electronic device 130 and other devices (e.g., electronic device 131) that are participating in the CGR setting. When it is determined that the electronic device 130 is moving toward the electronic device 131 and/or it is within a threshold distance from electronic device 131, it may be determined that user 120 of the electronic device 130 is requesting to initiate a private conversation with user 125.

In one aspect, the electronic device 130 may determine whether to initiate to private conversation based on an eye gaze of the first user. For example, referring to FIG. 1, the electronic device 130 may obtain image data from a camera of the electronic device 130. From the image data, the electronic device 130 may determine that the user 1's direction of gaze is towards user 2 125. Upon determining that user 1 is looking at user 2, the electronic device 130 may initiate the private conversation. In one aspect, the initiation of the private conversation may be based on whether user 1's direction of gaze is aimed towards another user (e.g., user 2) for a period of time. In one aspect, the initiation of the private conversation may be based on a direction of gaze towards an object in the physical setting or the CGR setting.

In one aspect, the determination of whether to initiate the private conversation may be based on an eye gaze of the first user and the second user with which the first user wishes to initiate the private conversation. For instance, the electronic device 130 may determine the eye gaze of the first user as a direction of gaze of the first user based on sensor data. The electronic device 130 may obtain a direction of gaze of the second user from the second user's electronic device. The determination of whether to initiate the private conversation may be based on determining that there is mutual eye contact between the first user and the second user based on the direction of gaze of the first user and the direction of gaze of the second user.

Up to this point, the determination of whether to initiate the private conversation has been based on physical characteristics of the user of the electronic device, which are performed in the physical setting. In one aspect, this determination may be based on virtual characteristics (or movements) performed by the user's avatar within the CGR setting. For instance, user input and/or sensor data obtained by the controller 305 may control virtual movements of a user's avatar in the CGR setting, as described herein. These virtual movements may be similar physical characteristics (or movements) that are described herein as being indicative of a user wanting to initiate a private conversation. For instance, referring to FIG. 1, the virtual movement may be avatar 135 leaning towards avatar 140 in a similar fashion as illustrated in stage 105. The privacy cloak 160 may be activated as a result of the virtual movement. In this case, the avatars would be within a close virtual proximity to each other (e.g., a virtual position of on avatar may be within a threshold distance of a virtual position of another avatar), while the users 120 and 125 may be in separate locations entirely (e.g., in different offices). In one aspect, the virtual position of an avatar may be determined based on sensor data of the electronic device. If the controller 305 determines that the private conversation should not be initiated based on the movement and/or command, the process 400 returns to block 410 to continue to obtain the microphone signal.

In one aspect, the determination of whether to initiate the private conversation may also be based on eye gaze of the first user (and/or second user) with respect to the user(s) avatars. For instance, the electronic device 130 may determine the direction of gaze of the first user as a direction of gaze of the first user's avatar based on sensor data (e.g., image data captured by an internal camera). The electronic device 130 may obtain a direction of gaze of the second user's avatar, and determine whether to initiate the private conversation based on there being mutual eye contact between both avatars.

Upon determining that the private conversation should be initiated, the process 400 causes a private conversation to be activated within the CGR setting (at block 430). While in a private conversation, speech or other audio of the first user may not be projected into the CGR setting and may instead be limited to those users in the private conversation. For example, speech or other audio of the first user may only be communicated to electronic devices associated with users in the private conversation.

In some examples, initiating a private conversation can include causing a privacy cloak to activate in the CGR setting. Subsequent to the activation of the privacy cloak causes speech of the user to be contained within the cloak and not projected out into a remainder of the CGR setting in order to prevent others participating within the CGR setting that are not within the cloak from hearing the user's speech. For example, as described herein, to prevent others within the CGR setting from hearing speech between users who are engaged in the private conversation, the users' electronic devices may establish a private two-way audio communication channel. In this case, microphone signals produced by microphones of the electronic devices may be exchanged (e.g., only) between the electronic devices, but not with other electronic devices of users who are participating in the remainder of the CGR setting. For example, referring to FIG. 1, electronic device 130 may exchange microphone signals with electronic device 131, while abstaining (e.g., being prevented) from transmitting (e.g., not providing) microphone signals to electronic devices associated with avatars 145 and 150. Thus, initiating the private conversation may include the electronic device 130 providing a microphone (e.g., audio) signal to the (e.g., electronic device 131 of the) second user 125.

In one aspect, upon activation of the privacy cloak, the controller 305 may perform audio processing operations upon audio data obtained from other participants engaged in the private conversation. Specifically, the controller 305 may process the audio data to account for virtual room characteristics of the privacy cloak by adding reverberation. Such processing may give the user of the electronic device 130 the perception of being in a physical room of a same size of the privacy cloak. In another aspect, the controller 305 may perform similar processing upon audio data containing sounds that are present within the remainder of the CGR setting.

In one aspect, instead of exchanging microphone signals, electronic devices of users who are to be engaged in the private conversation may mute (or deactivate) their respective microphones if the electronic devices are close enough to one another. For instance, electronic device 130 obtains position data of the electronic devices of users who are to be engaged in the private conversation. In one aspect, to obtain position data, the electronic device may transmit a message to the other electronic device(s), requesting for position data. For example, referring to FIG. 1, the first electronic device 130 may obtain position data from the second electronic device 131, since users of both electronic device are to be engaged in a private conversation. The electronic device 130 determines whether electronic device 131 is within a threshold distance within the physical setting. For example, the electronic device 130 may determine whether the electronic device 131 is within a circular area with a particular radius (e.g., five feet), where the electronic device 130 is at the center. If so, the electronic device 130 deactivates (or mutes) its microphone(s) in order to prevent speech of the first user from being captured. Specifically, since it is determined that both electronic devices are close to each other within the physical environment, it may be assumed that both users want to have a conversation within the physical environment that is not projected into the CGR setting. In one aspect, the electronic device 130 may transmit a message to the electronic device 131, indicating that its microphone(s) is to be deactivated as well. If, however, the electronic devices are not within the threshold distance, a private two-way audio communication channel may be established between both electronic devices, as described herein.

In one aspect, the microphone(s) may remain muted while the users are engaged in the private conversation (e.g., while the electronic devices are within the threshold distance of one another). When, however, it is determined that either of the users terminate the private conversation, the microphones may be unmuted. More about determining whether a private conversation is terminated is described herein.

In one aspect, the microphone signals (or audio data) exchanged between the electronic devices via the private communication channel may be encrypted in order to prevent others who are not participating in the private conversation from eavesdropping on the conversation. Thus, a microphone signal produced by a microphone of electronic device 130 may be encrypted to generate an encrypted microphone signal. In one aspect, any encryption algorithm (e.g., Advanced Encryption Standard (AES), etc.) may be used to encrypt (and decrypt) the microphone signals that is exchanged between electronic devices. The electronic device then transmits the encrypted microphone signal, via a network (e.g., 210), to electronic device 131 to be decrypted in order to output speech through a speaker.

When, however, other users are granted authorization to participate in the private conversation, as described herein, their electronic devices may be provided with a capability to access the encrypted microphone signals. For example, an electronic device of a participant of the private conversation may provide a key to the electronic device of the newest participant, which the electronic device of the newest participant uses to decrypt the encrypted signal.

It should be understood that the encryption of the audio data may be an additional layer of protection for users that are engaged in a private conversation. In general, data exchanged between electronic devices of users that are presenting a CGR setting, regardless of whether users are engaged in a private conversation is encrypted in order to secure data. Thus, in one aspect, the audio data exchanged during a private conversation may be encrypted twice.

As described herein, the privacy cloak is a visual indication displayed on electronic devices participating within the CGR setting that users within the cloak are having a private conversation. As illustrated in FIG. 1, the cloak may be a barrier (e.g., a cylinder) that surrounds the avatars. In one aspect, the barrier may be one of transparent (e.g., not shown in the CGR setting), translucent, and opaque; and may be any color (e.g., blue). In another aspect, the cloak may be a tunnel that stretches (or projects) between the avatars that are engaged in the private conversation. In another aspect, the privacy cloak may be any type of visual indication, such as a token that floats above an avatar's head. In one aspect, the privacy cloak may be visualized differently to users who are associated with avatars that are inside and/or outside the cloak. For example, referring to FIG. 1, the users of avatars 145 and 150 may both visualize the privacy cloak differently 160.

In one aspect, users associated with avatars that are within a privacy cloak may not visualize the privacy cloak 160 at all. Specifically, although those outside the privacy cloak may see a barrier, users who are engaging in the private conversation may new the CGR setting normally (e.g., without seeing a barrier surrounding their avatars).

In one aspect, the controller 305 determines which kind of privacy cloak is to be activated based on position data of the avatars within the CGR setting. For instance, if the controller 305 determines that the avatars are within a threshold (e.g., virtual) distance of each other within the CGR setting, such as the avatars 135 and 140 of FIG. 1, the privacy cloak may be a barrier that includes both avatars. If, however, the avatars are not within the threshold distance, the privacy cloak may be a tunnel or another visual indication, such as the token.

In another aspect, in addition (or in lieu of) activating and presenting a private cloak while users are engaged in the private conversation, other visual and/or audio indicators may be presented to users that are not a part of the conversation. As one example, the avatars of users who are engaged in the private conversation may be animated as if to illustrate they are having a conversation. For instance, mouths of the avatars may move during the conversation. In an alternative aspect, the avatars may display no indication that a private conversation is taking place. For instance, the avatars may exert natural sporadic movements, such as blinking and an occasional shifting about. Such natural movements may be an attempt to hide the fact that the user of the avatar is engaged in a private conversation. As a result, in this aspect, no privacy cloak may be presented to other users. In one aspect, the visual appearance of the avatars that are within the cloak may be further modified. For instance, the avatars may be blurred or desaturated with respect to avatars that are not within the cloak.

In another example, a sound other than the speech spoken between users who are engaged in the private conversation may be projected from the privacy cloak into the remainder of the CGR setting. In one aspect, this sound may be projected from the privacy clock while speech of either of the users is projected into the privacy cloak. In one aspect, the sound is projected in sync (or intermittently) while the users engaged in the private conversation are speaking. As a result, the electronic device may monitor microphone signals and perform a speech recognition algorithm to determine when the user is speaking. When it is determined the user is speaking, the electronic device may transmit an audio signal having sound to be outputted by electronic devices of others that are not in the conversation. In one aspect, the sound may be one of unintelligible speech, sound cues (e.g., dings, etc.), or music.

In one aspect, users engaged in the private conversation may continue to perceive sounds of the CGR setting. Specifically, upon the activation of the privacy cloak, an electronic device may continue to output sound from within the CGR setting. For instance, referring to FIG. 1, if speech of a user of avatar 145 were projected into the CGR setting, users 1 and 2 may continue to hear the speech. The difference, however, is that while the privacy cloak 160 is activated, the electronic device 130 may output speech of the second user 125 that is only projected into the privacy cloak 160. Thereby keeping the speech of the second user 125 within the confines of the cloak. Thus, the electronic device 130 may drive one or more speakers 325 to output (e.g., a combination of) at least one audio signal that contains sounds of the CGR setting and/or an audio signal containing speech of user 2 (e.g., obtained from electronic device 131). In another aspect, users engaged in the private conversation may perceive sounds of the CGR setting differently than when the privacy cloak is not active. For example, while the privacy cloak is activated, electronic device of users who are engaged in the private conversation may perform audio processing operations upon at least one audio signal that has sound of the CGR setting. For example, the controller 305 may perform spectral shaping or dynamic range control upon the audio signal. As another example, the controller 305 may attenuate the audio signal to reduce a sound level of a particular sound within the CGR setting (e.g., speech of another user who is not participating in the private conversation). In another aspect, the controller 305 may attenuate all or most sounds within the CGR setting while the privacy cloak is activated. In one aspect, no sound from the CGR setting leaks into the privacy cloak. Thus, audibly isolating the users who are engaged in the private conversation. In one aspect, the controller 305 may stop using the audio signal that contains one or more sounds of the CGR setting to drive the speaker 325, while the privacy clock is active.

Returning to FIG. 4, the process 400 determines whether the private conversation has been terminated by either of the users based on another movement or another explicit command (at decision block 435). For instance, similar to the operations performed at decision block 425, the controller 305 may determine whether a user is requesting to terminate the conversation based on a comparison between predefined movements or commands. In one aspect, this determination may be based on whether obtained sensor data has indicated a movement that was opposite of the one performed by the user to initiate the private conversation. As an example, referring to FIG. 1, the controller 305 may determine that the user 120 has moved away from user 125 and back to a sitting position illustrated in stage 100. In another aspect, the determination may be based on a virtual movement (e.g., whether avatar 140 has stepped out of the privacy cloak 160). If not, the process 400 returns to block 430 to maintain the private conversation e.g., by keeping the privacy cloak active. Otherwise, the process 400 proceeds to terminate the private conversation by e.g., deactivating the privacy cloak upon a determination that the private conversation should be terminated in order to allow speech of the first user to be shared with other users of the CGR setting or projected into the remainder of the CGR setting (at block 440).

In one aspect, upon deactivating the privacy cloak, visual representations of avatars that were changed upon the activation of the privacy cloak may be returned to their previous state. For instance, as described herein, the visual representation of the avatars may be blurred or desaturated, while the privacy cloak is activated. Upon deactivation, these effects may be removed.

Some aspects perform variations of the process 400. For example, in lieu of (or in addition to) obtaining sensor data, the controller 305 may obtain image data (or digital images) captured by the camera 310 that represents a scene of the physical setting within a field of view of the camera 310. The controller 305 may determine whether a private conversation should be initiated based on a detection of objects within the scene according to a performance of an object recognition algorithm upon the image data. More about how image data may be used to determine whether a private conversation should be initiated is described herein.

In another variation, the process 400 determines whether a private conversation should be initiated at decision block 425 is based on whether the second user has accepted a request to engage in the private conversation with the first user. For instance, upon determining that the first user is requesting to engage in the private conversation (based on the movement and/or explicit command), the electronic device 130 may transmit (via a computer network) a request message to the electronic device (e.g., 131) of the second user to initiate a private conversation. In one aspect, the request message may indicate that the first user is requesting to initiate the private conversation. For instance, the request may be a textual message that is displayed on the display screen 340 and/or may be an audible message that is outputted through one or more speakers. In another aspect, the electronic device 131 may display a visual representation of the request within the CGR setting. For example, the avatar 135 of the first user 120 may exhibit the visual representation as an aura that surrounds the avatar 135 or a token that is displayed atop the avatar 135. If the second user 125 wishes to accept the request, the second user may cause the avatar 140 to enter (or touch) the visual representation (e.g., causing avatar 140 to enter and/or touch the aura of the avatar 135). In one aspect, the second user may accept the request by activating (e.g., through a selection of a UI item) an aura for avatar 140 and having the aura of avatar 135 touch the aura of avatar 135. In another aspect, the second user 125 may accept by performing a movement and/or issuing an explicit command. In one aspect, the movement and/or explicit command performed by the second user may be the same or similar to the movement and/or command performed by the first user to initiate the private conversation. Once accepted, the second user's electronic device may transmit an acceptance message to the electronic device 130, and the process 400 may proceed. In one aspect, upon deactivation of the privacy cloak, auras of avatars may split or "pop" to form each avatar's individual aura.

In another variation, a user may activate a privacy cloak in the CGR setting before engaging in a private conversation with another user. For example, the user may activate an empty privacy cloak (e.g., through a movement or a voice command) in the CGR setting. For instance, the user may draw a shape (e.g., a circle, square, etc.) within the CGR setting (e.g., on a virtual floor) in order to activate a privacy cloak, whose boundaries are defined by the shape. Once initiated, the user may cause an avatar of the user to walk into the privacy cloak. Once inside, speech produced by the user will not be projected out of the privacy cloak, as described herein. If another user wishes to conduct a private conversation with the user, the other user may request to join the privacy cloak or simply cause the other user's avatar to interact with the activated privacy cloak (e.g., to walk into the privacy cloak, to touch the privacy cloak, etc.). More about users requesting to join privacy cloaks is described herein.

FIG. 5 is a flowchart of one aspect of a process 500 to allow a (e.g., third) user who is not participating in a private conversation between two other users (e.g., a first user and a second user) to join the private conversation. The process 500 begins by activating a privacy cloak around the avatars of the first user and the second user (at block 505). For example, the first user may be user 1 120 and the second user may be user 2 125, both of which are having a private conversation in the privacy cloak 160 as illustrated in stage 105 of FIG. 1. The process 500 detects that the third user (e.g., the user of avatar 145) who is not participating in the private conversation is requesting to join the private conversation (at block 510). Specifically, the electronic device 130 may base this determination on an implicit request from the electronic device of the third user or an explicit request. An implicit request may be based on actions performed by the third user. For example, when a privacy cloak is activated, such as the cloak 160 illustrated in FIG. 1, the determination may be based on whether avatar 145 of the third user is within a threshold distance of the privacy cloak 160 and/or within a threshold distance of avatars 135 and/or 140 of users who are already within the cloak 160. This may be similar to a person in a cocktail party walking up to a group of people to interject in a conversation. An explicit request may be an action performed by the third user (and/or an avatar of the user) to join the conversation (and the cloak). For example, the user may select a virtual menu item within the CGR setting through a hand gesture.

The process 500 alerts the first user and the second user who are participating in the private conversation that the third user wishes to join them (at block 515). In one aspect, the electronic device may alert a user by presenting an alert on the display screen and/or may alert the user by outputting an audio signal that informs the user of the request. In one aspect, one or more users who are participating in the private conversation may be alerted of the request. Thus, in this example, users 1 and 2 may also be alerted. The process 500 determines whether authorization has been received to allow the third user to join the private conversation (at decision block 520). For instance, user 1 120 may provide authorization through a voice command, or a selection of a UI item (e.g., a virtual UI item in the CGR Setting). In one aspect, the process 500 may wait a predetermined amount of time (e.g., ten seconds) for a user to provide authorization. When the user 1 120 declines to provide authorization (either by ignoring the alert or affirmatively denying the request), the process 500 sends a denial to the third user (at block 530). For example, a message may be transmitted to the electronic device of the third user, which is presented (e.g., either on a display or through a speaker) to alert the third user that authorization has been denied. Otherwise, when user 1 120 and/or user 2 125 provide authorization, the process 500 adds avatar 145 of the third user into the privacy cloak (at block 525). Specifically, along with adding the third user, the electronic device 130 establishes a 3-way communication between the three users. In one aspect, as described herein, the electronic device 130 may first determine whether each of the user's electronic devices are within a close proximity (e.g., within a threshold distance from one another). If so, the electronic device 130 may transmit a control signal to the electronic device of the third user to mute the third user's microphone. If, however, the electronic device is not within the threshold distance, the electronic device 130 (and/or electronic device 131) may establish a private 2-way (or 3-way) communication channel with the electronic device of the third user. As a result, in one aspect, the electronic device of the third user will begin exchanging audio data with electronic device 130 and/or 131.

Some aspects perform variations of the process 500. For example, as described herein, each user participating in the private conversation may receive an alert that the third user wishes to join. In one aspect, the third user will only be able to join if most (e.g., more than half) or all of the users who are already participating in the private conversation provide authorization.

Up to this point, the privacy cloak has been described as an indication (visual and/or audio) that users who are participating within a CGR setting are engaged in a private conversation. In another aspect, a privacy cloak may (e.g., also) be a visual indication presented in a CGR setting to represent that users who activated the privacy cloak (and/or have associated avatars that are within the confines of the cloak) do not authorize (or consent) others participating within the remainder of the CGR setting to record audio projected by the avatars within the confines of the cloak. For example, in a physical setting, a person may be made aware that another person is recording video and/or audio because such recording involves activating a recording device (e.g., a video recorder) that is visible within the physical setting. Recording within a CGR setting, however, may be less apparent. For example, a user who is participating within a CGR setting may cause (e.g., through a user command) the user's electronic device to record video and/or audio data of the CGR setting and store the data locally for later playback, without providing any indication to others who are participating within the CGR setting that such recording is taking place. Thus, upon activation of the privacy cloak, audio data (e.g., microphone signals) provided by electronic devices of users whose associated avatars are within the privacy cloak is not recordable by users whose avatars are not associated with the privacy cloak. In one aspect, all users participating within the CGR setting, regardless of whether or not associated with the privacy cloak, may hear sounds (e.g., speech) from the cloak in real time.

As a default in the CGR setting, users who are not associated with an activated privacy cloak are unable to record audio data provided by users who are associated with the privacy cloak. In one aspect, users must request authorization (e.g., opt in) from at least one user already associated with a privacy cloak to record. Upon receiving authorization, a user's electronic device may provide an option to record audio (and/or video) data. In another aspect, the default may be the reverse, such that a user who activates (or is associated with) a privacy cloak must individually withdraw authorization from others who are participating within the CGR setting from being able to record audio data projected while the user's avatar is inside the privacy cloak.

As described herein, some aspects perform variations of the processes described above. For example, the specific operations of these processes may not be performed in the exact order shown and described. The specific operations may not be performed in one continuous series of operations and different specific operations may be performed in different aspects. For example, some operations, such as the operations described in blocks 415, 435, and/or 440 of FIG. 4, may be optional and therefore do not have to be performed. In one aspect, at least some of the operations associated with blocks of dashed lines may be performed, while others may be omitted. As another example, the process 400 may begin at block 410, thereby omitting the operations described at block 405.

An aspect of the disclosure may be a non-transitory machine-readable medium (such as microelectronic memory) having stored thereon instructions, which program one or more data processing components (generically referred to here as a "processor") to perform the network operations, signal processing operations (e.g., audio processing operations), and rendering processing operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

As described herein, one aspect of the disclosure is the determining and use of sensor data to determine whether to initiate a private conversation between two users of electronic devices, such as HMDs. In some instances, this sensor data may include personal information data that uniquely identifies or can be used to identify a person. Such personal information data can include location-based data, online identifiers, or any other personal information.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard.

Despite the foregoing, the present disclosure also contemplates aspects in which users may selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:
conducting a communication session between a first user of a first electronic device and a second user of a second electronic device through a computer-generated reality (CGR) setting;
driving a speaker of the first electronic device with an audio signal that comprises sound of the CGR setting;
capturing, using a microphone of the first electronic device, speech of the first user as a microphone signal;
transmitting the speech of the first user captured as the microphone signal to the second electronic device;
determining whether the second user is within a threshold distance of the first user within a physical setting;
responsive to determining that the second user is within the threshold distance, ceasing to 1) transmit the speech of the first user to the second electronic device and 2) drive the speaker of the first electronic device with the audio signal; and
responsive to determining that the second user has moved outside the threshold distance, continuing to at least one of 1) transmit the speech of the first user to the second electronic device or 2) drive the speaker of the first electronic device with the audio signal.

2. The method of claim 1, wherein determining whether the second user is within the threshold distance comprises
determining whether the first user is to engage in a conversation with the second user based on sensor data of at least one sensor of the first electronic device.

3. The method of claim 2, wherein determining whether the first user is to engage in the conversation with the second user comprises determining, based on the sensor data, that an eye gaze of the first user is in a direction of the second user.

4. The method of claim 1, wherein the speaker is one of a plurality of speakers of the first electronic device, wherein driving comprises using the plurality of speakers of the first electronic device to produce a directional beam pattern comprising the sound of the CGR setting and that is directed towards an ear of the first user.

5. The method of claim 1, wherein the microphone is one of a plurality of microphones of the first electronic device, wherein capturing the speech comprises producing, using a plurality of microphone signals captured by the plurality of microphones, a sound pickup directional beam pattern that is directed towards a mouth of the first user as an output audio signal, wherein transmitting the speech of the first user comprises transmitting the output audio signal.

6. The method of claim 1, wherein the second user is one of a plurality of users of a plurality of electronic devices between which the first user conducts the communication session through the CGR setting, wherein the method further comprises:
transmitting the speech of the first user to the plurality of electronic devices;
determining whether the first user and the second user are to engage in a private conversation based on sensor data of a sensor; and
responsive to determining that the first user and the second user are to engage in the private conversation, ceasing to transmit the speech of the first user to the plurality of electronic devices other than the second electronic device.

7. The method of claim 6 further comprising:
determining that a third user of the plurality of users wishes to join the private conversation between the first user and the second user; and
responsive to receiving authorization from at least one of the first user and the second user, transmitting the speech of the first user to a third electronic device of the third user and receiving audio signals from the second electronic device and the third electronic device for playback through the speaker of the first electronic device.

8. The method of claim 7 further comprising, responsive to determining that the first user and the second user are to engage in the private conversation,
transmitting a request for authorization to record audio data provided by the second electronic device during the communication session; and
responsive to receiving the authorization, presenting a user interface (UI) item on a display of the first electronic device for recording the audio data.

9. A first electronic device comprising:
a microphone;
a speaker;
at least one processor; and
memory having stored therein instructions which when executed by the at least one processor causes the first electronic device to:
conduct a communication session between a first user of the first electronic device and a second user of a second electronic device through a computer-generated reality (CGR) setting;
drive the speaker with an audio signal that comprises sound of the CGR setting;
capture, using the microphone, speech of the first user as a microphone signal;
transmit the speech of the first user captured as the microphone signal to the second electronic device;
determine whether the second user is within a threshold distance of the first user within a physical setting;
responsive to a determination that the second user is within the threshold distance, cease to 1) transmit the speech of the first user to the second electronic device and 2) drive the speaker with the audio signal; and
responsive to a determination that the second user has moved outside the threshold distance, continue to at least one of 1) transmit the speech of the first user to the second electronic device or 2) drive the speaker with the audio signal.

10. The first electronic device of claim 9, wherein the instructions to determine whether the second user is within the threshold distance comprises instructions to
determine whether the first user is to engage in a conversation with the second user based on sensor data of at least one sensor of the first electronic device.

11. The first electronic device of claim 10, wherein the instructions to determine whether the first user is to engage in the conversation with the second user comprises instructions to determine, based on the sensor data, that an eye gaze of the first user is in a direction of the second user.

12. The first electronic device of claim 9 further comprises a plurality of speakers that includes the speaker, wherein the instructions to drive comprises instructions to use the plurality of speakers to produce a directional beam pattern comprising the sound of the CGR setting and is directed towards an ear of the first user.

13. The first electronic device of claim 9, wherein the microphone is one of a plurality of microphones of the first electronic device, wherein the instructions to capture the speech comprises instructions to produce, using a plurality of microphone signals captured by the plurality of microphones, a sound pickup directional beam pattern that is directed towards a mouth of the first user as an output audio signal, wherein the instructions to transmit the speech of the first user comprises instructions to transmit the output audio signal to the second electronic device.

14. The first electronic device of claim 9, wherein the second user is one of a plurality of users of a plurality of electronic devices between which the first user conducts the communication session through the CGR setting, wherein the memory has further instructions to:

transmit the speech of the first user to the plurality of electronic devices;

determine whether the first user and the second user are to engage in a private conversation based on sensor data of a sensor of the first electronic device; and responsive to a determination that the first user and the second user are to engage in the private conversation, cease to transmit the speech of the first user to the plurality of electronic devices other than the second electronic device.

15. The first electronic device of claim 9, wherein the first electronic device and the second electronic device are both head-mounted devices (HMDs).

16. A non-transitory machine-readable medium having stored therein instructions which when executed by at least one processor of a first electronic device:

conduct a communication session between a first user of the first electronic device and a second user of a second electronic device through a computer-generated reality (CGR) setting;

drive a speaker of the first electronic device with an audio signal that comprises sound of the CGR setting;

capture, using a microphone, speech of the first user as a microphone signal;

transmit the speech of the first user captured as the microphone signal to the second electronic device;

determine whether the second user is within a threshold distance of the first user within a physical setting;

responsive to a determination that the second user is within the threshold distance, cease to 1) transmit the speech of the first user to the second electronic device and 2) drive the speaker of the first electronic device with the audio signal; and responsive to a determination that the second user has moved outside the threshold distance, continue to at least one of 1) transmit the speech of the first user to the second electronic device or 2) drive the speaker of the first electronic device with the audio signal.

17. The non-transitory machine-readable medium of claim 16, wherein the instructions to determine whether the second user is within the threshold distance to determine whether the first user is to engage in a conversation with the second user based on sensor data of at least one sensor of the first electronic device.

18. The non-transitory machine-readable medium of claim 17, wherein the instructions to determine whether the first user is to engage in the conversation with the second user comprises instructions to determine, based on the sensor data, that an eye gaze of the first user is in a direction of the second user.

19. The non-transitory machine-readable medium of claim 16, wherein the instructions to drive comprises instructions to use a plurality of speakers that includes the speaker of the first electronic device to produce a directional beam pattern comprising the sound of the CGR setting and is directed towards an ear of the first user.

20. The non-transitory machine-readable medium of claim 16, wherein the microphone is one of a plurality of microphones, wherein the instructions to capture the speech comprises instructions to produce, using a plurality of microphone signals captured by the plurality of microphones, a sound pickup directional beam pattern that is directed towards a mouth of the first user as an output audio signal, wherein the instructions to transmit the speech of the first user comprises instructions to transmit the output audio signal to the second electronic device.

21. The method of claim 1, wherein responsive to determining that the second user has moved outside the threshold distance after the second user being within the threshold distance, continuing to transmit the speech and drive the speaker of the first electronic device with the audio signal.

* * * * *